(12) United States Patent
Watson et al.

(10) Patent No.: US 10,536,292 B1
(45) Date of Patent: Jan. 14, 2020

(54) SYSTEMS AND METHODS FOR PRE-CONFIGURING A PAYMENT VEHICLE

(71) Applicant: United Services Automobile Association (USAA), San Antonio, TX (US)

(72) Inventors: James Christopher Watson, San Antonio, TX (US); Gina R. Smith, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 16/402,052

(22) Filed: May 2, 2019

Related U.S. Application Data

(63) Continuation of application No. 16/020,613, filed on Jun. 27, 2018, now Pat. No. 10,320,581, which is a continuation of application No. 14/534,850, filed on Nov. 6, 2014, now Pat. No. 10,027,501.

(51) Int. Cl.
| | |
|---|---|
| *H04L 12/28* | (2006.01) |
| *G06Q 20/40* | (2012.01) |
| *G06Q 20/20* | (2012.01) |
| *G06Q 10/10* | (2012.01) |
| *G05B 15/02* | (2006.01) |
| *G06Q 20/12* | (2012.01) |
| *G06F 15/16* | (2006.01) |
| *H04L 29/08* | (2006.01) |
| *H04B 5/00* | (2006.01) |

(52) U.S. Cl.
CPC .......... *H04L 12/2809* (2013.01); *G05B 15/02* (2013.01); *G06F 15/16* (2013.01); *G06Q 10/1095* (2013.01); *G06Q 20/12* (2013.01); *G06Q 20/202* (2013.01); *G06Q 20/40* (2013.01); *H04L 67/325* (2013.01); *G05B 2219/2642* (2013.01); *H04B 5/0031* (2013.01)

(58) Field of Classification Search
None
See application file for complete search history.

(56) References Cited

U.S. PATENT DOCUMENTS 6,204,763 B1 * 3/2001 Sone .................... A47G 29/141
221/2
8,312,660 B1 * 11/2012 Fujisaki .................. F41A 17/08
42/70.01

(Continued)

OTHER PUBLICATIONS

U.S. Appl. No. 16/020,613, filed Jun. 27, 2018, Systems and Methods for Pre-Configuring a Payment Vehicle.

(Continued)

*Primary Examiner* — Gurkanwaljit Singh
(74) *Attorney, Agent, or Firm* — Perkins Coie LLP

(57) ABSTRACT

Methods and systems for pre-configuring a payment vehicle are described. In some embodiments, transaction criteria pertaining to a payment vehicle is proactively received in advance of an anticipated transaction. A transaction authorization request may be received from a point of sale device and may be generated by the point of sale device in response to an attempted use of the payment vehicle. Information about the transaction in the transaction request may be compared with the transaction criteria to determine whether to authorize the transaction.

20 Claims, 8 Drawing Sheets

(56) References Cited

U.S. PATENT DOCUMENTS

| | | | | |
|---|---|---|---|---|
| 8,628,971 | B2* | 1/2014 | Fritchie | G01N 35/00732 436/43 |
| 8,890,680 | B2* | 11/2014 | Reeser | G06Q 30/04 340/539.11 |
| 9,183,578 | B1* | 11/2015 | Reeser | G06Q 30/04 |
| 9,665,892 | B1* | 5/2017 | Reeser | G06Q 30/04 |
| 9,911,290 | B1* | 3/2018 | Zalewski | G07G 1/0072 |
| 2009/0125411 | A1* | 5/2009 | Otto | G06Q 20/16 705/34 |
| 2009/0254572 | A1* | 10/2009 | Redlich | G06Q 10/06 |
| 2010/0102930 | A1* | 4/2010 | McCoy | G06F 19/3462 340/5.92 |
| 2010/0106521 | A1* | 4/2010 | Ashrafzadeh | G06F 19/3462 705/3 |
| 2010/0106626 | A1* | 4/2010 | Ashrafzadeh | G06Q 10/08 705/29 |
| 2013/0110666 | A1* | 5/2013 | Aubrey | G06Q 30/0269 705/26.5 |
| 2013/0137093 | A1* | 5/2013 | Fritchie | G01N 35/00732 435/6.1 |
| 2013/0191243 | A1* | 7/2013 | Jung | G06Q 30/0633 705/26.8 |
| 2014/0006131 | A1* | 1/2014 | Causey | G06Q 10/0875 705/14.24 |
| 2014/0201072 | A1* | 7/2014 | Reeser | G06Q 30/04 705/40 |
| 2014/0279422 | A1* | 9/2014 | Holman | G06Q 20/12 705/39 |
| 2015/0097681 | A1* | 4/2015 | Fadell | F24F 11/30 340/628 |

OTHER PUBLICATIONS

U.S. Appl. No. 14/534,850, filed Nov. 6, 2014, Systems and Methods for Pre-Configuring a Payment Vehicle.
Ondot Systems, "Home", retrieved from http://www.ondotsystems.com/, 2014, 1 page.
Ondot Systems, "Demonstration Videos", retrieved from http://www.ondotsystems.com/resources/video, 2014, 2 pages.
Ondot Systems, "Solution Brochure—Mobile Card Services: Consumer Control Over Payment Cards", retrieved from http://www.ondotsystems.com/, 2014, 8 pages.
Ondot Systems, "Products—Overview", retrieved from http://www.ondotsystems.com/products, 2014, 2 pages.
Ondot Systems, "Products—Card Control", retrieved from http://www.ondotsystems.com/products/control, 2014, 4 pages.
Ondot Systems, "Products—Interactive Alerts", retrieved from http://www.ondotsystems.com/products/alerts, 2014, 5 pages.
Ondot Systems, "Products—Self Service", retrieved from http://www.ondotsystems.com/products/selfservice, 2014, 3 pages.
Ondot Systems, "Products—Management Console", retrieved from http://www.ondotsystems.com/products/console, 2014, 2 pages.
Ondot Systems, "Products—Fraud Watch", retrieved from http://www.ondotsystems.com/products/fraudwatch, 2014, 2 pages.
Ondot Systems, "Technology—Overview", retrieved from http://www.ondotsystems.com/technology, 2014, 2 pages.
Ondot Systems, "Technology—Architecture", retrieved from http://www.ondotsystems.com/technology/architecture, 2014, 2 pages.
Ondot Systems, "Technology—Security", retrieved from http://www.ondotsystems.com/technology/security, 2014, 2 pages.
Ondot Systems, "Technology—Platform", retrieved from http://www.ondotsystems.com/technology/platform, 2014, 2 pages.
Ondot Systems, "Technology—Management", retrieved from http://www.ondotsystems.com/technology/management, 2014, 2 pages.
Ondot Systems, "Resources", retrieved from http://www.ondotsystems.com/resources, 2014, 1 page.
Ondot Systems, "Mobile Card Services Card Control Brochure", retrieved from http://www.ondotsystems.com/resources/brochures, 2014, 4 pages.
Ondot Systems, "Mobile Card Services Interactive Alerts Brochure", retrieved from http://www.ondotsystems.com/resources/brochures, 2014, 4 pages.
Ondot Systems, "Product Feature Sheet", retrieved from http://www.ondotsystems.com/resources/brochures, 2014, 1 page.
Ondot Systems, "Resources—Reports", retrieved from http://www.ondotsystems.com/resources/reports, 2014, 1 page.
Ondot Systems, "Resources—Brochures", retrieved from http://www.ondotsystems.com/resources/brochures, 2014, 1 page.
Wester, James, "Ondot Systems Private Vendor Watchlist Profile: "A 'Remote Control' for Plastic"", International Data Corporation (IDC) Report, retrieved from http://www.ondotsystems.com/resources/reports, May 2014, 6 pages.

\* cited by examiner

SYSTEMS AND METHODS FOR PRE-CONFIGURING A PAYMENT VEHICLE

CROSS-REFERENCE TO RELATED APPLICATIONS

This application is a continuation of U.S. patent application Ser. No. 16/020,613, entitled "SYSTEMS AND METHODS FOR PRE-CONFIGURING A PAYMENT VEHICLE", filed on Jun. 27, 2018, now allowed, which is a continuation of U.S. patent application Ser. No. 14/534,850, entitled "SYSTEMS AND METHODS FOR PRE-CONFIGURING A PAYMENT VEHICLE", filed on Nov. 6, 2014, issued as U.S. Pat. No. 10,027,501 on Jul. 17, 2018, which is hereby incorporated by reference for all purposes in its entirety.

TECHNICAL FIELD

Various embodiments of the present disclosure generally relate to payment vehicles. More specifically, various embodiments of the present disclosure relate to methods and systems for pre-configuring payment vehicles prior to a transaction.

BACKGROUND

Credit card fraud results in millions of dollars of loss for credit card issuing companies and/or for merchants. Preventing credit card fraud is an ongoing challenge for credit card companies and merchants. When a credit card is stolen or lost, the customer may call the issuing company to report the loss. However, a thief may make hundreds or thousands of dollars in unauthorized purchases before the theft is noticed or reported.

Existing theft measures include requiring the customer to sign a receipt and ensuring that the signature matches a signature panel on the back of the card. But, signatures are not required for all transactions. Moreover, signatures may be easily forgeable. Another existing theft measure is to require a photo identification to verify the identity of the purchaser. However, in some jurisdictions, it is illegal for merchants to demand cardholder identification.

BRIEF DESCRIPTION OF THE DRAWINGS

Embodiments of the present disclosure will be described and explained through the use of the accompanying drawings in which.

Figure 1:
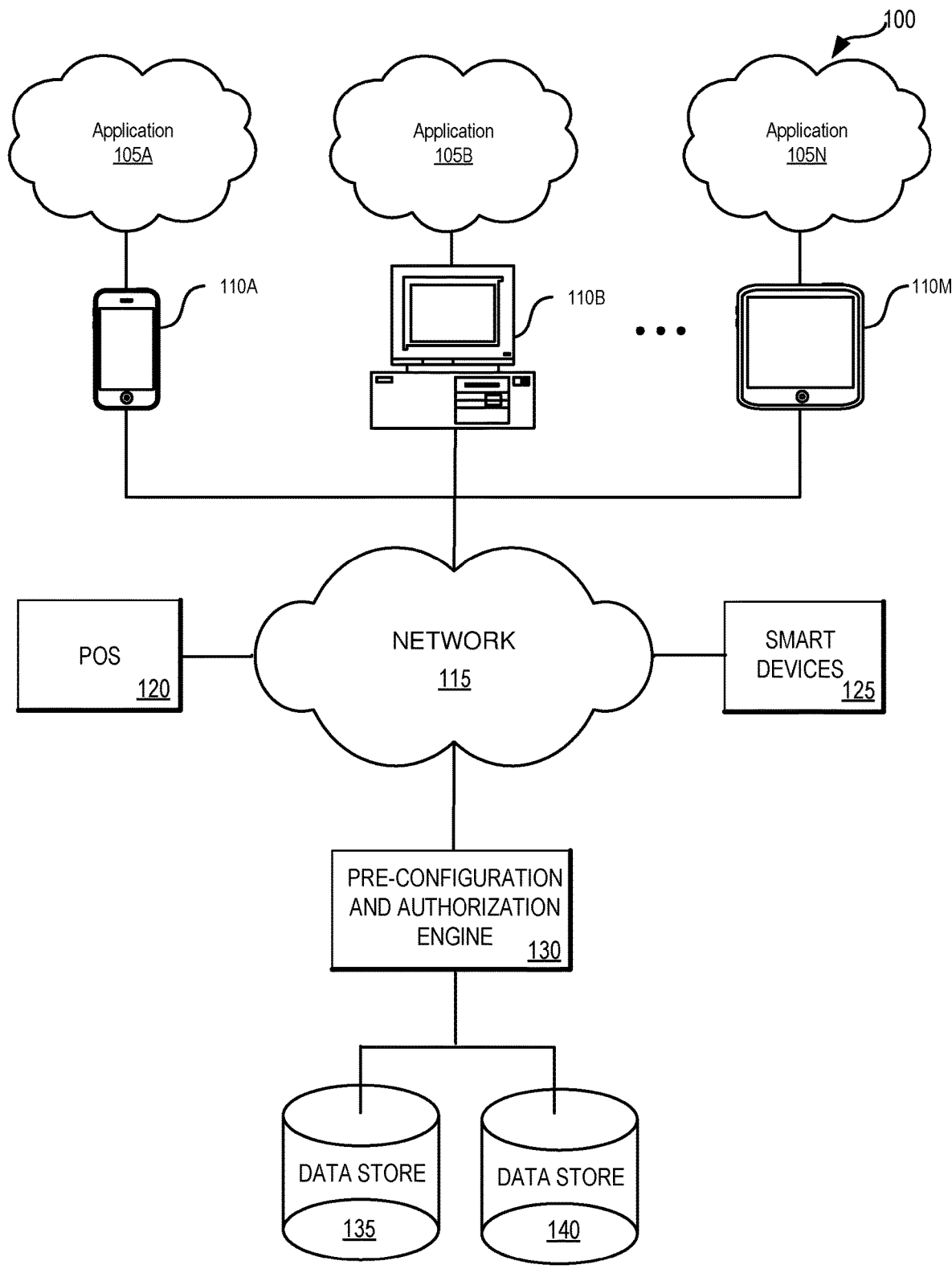
FIG. 1 illustrates an example of a network-based operating environment in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to payment vehicles. More specifically, various embodiments of the present disclosure relate to methods and systems for preconfiguring payment vehicles prior to a transaction.

Organizations, merchants, and customers incur thousands of dollars of losses due to fraud relating to payment vehicles such as credit cards and debit cards. Current solutions to protect payment vehicles such as credit card accounts from fraud involve generating temporary credit card numbers that map back to the protected card account. But, this solution is not scalable due to the finite number of valid card numbers that can be currently issued. Paying with cash may be impractical for many purchases such as expensive items and on-line purchases. Some embodiments in this disclosure present various methods to help reduce the likelihood of losses resulting from fraud.

In some embodiments, a user can pre-configure a payment vehicle for a particular transaction. In some embodiments, a payment vehicle may be any mechanism, device, instrument, or other object or software that can be used to purchase goods or services. For example, a payment vehicle may be a credit card, a debit card, an account number, a check, mobile wallet entry, stored value card, gift card, pre-paid card, or other vehicle for purchasing goods or services. In some embodiments, the payment vehicle must be pre-configured for a transaction before the payment vehicle can be used to pay for goods or services (i.e., the payment vehicle is rendered useless unless the payment vehicle has been pre-configured).

To pre-configure a payment vehicle for a particular transaction, the user may specify transaction criteria for a given transaction and communicate the transaction criteria to the organization that approves transactions. The transaction criteria may include a merchant location, a type of merchant, a date, a time, an amount, a type of purchase, ranges for the criteria, or other criteria. In accordance with various embodiments, the transaction criteria may be manually specified by the user via a mobile application, a web portal, a text message, an email, a phone call, an instant message, or any other communication method. In other embodiments, the transaction criteria may be automatically (or semi-automatically) specified using information from smart devices, mobile applications, global positioning systems, mobile devices, and other data sources.

After the payment vehicle is pre-configured, when the user (or a person impersonating the user) attempts to make a purchase with the payment vehicle, the transaction may be denied unless the transaction fits the transaction criteria set during the pre-configuration. An impersonator likely cannot guess exactly how the payment vehicle was pre-configured, particularly if the transaction criteria is defined very specifically (e.g., a narrow time window, a particular merchant, etc.). In some embodiments, transactions that do not meet every criteria set during the per-configuration may be scored. For example, elements of the transaction criteria may be weighted (e.g., by the user and/or scoring system). Then, any transaction meeting a certain score or that meet certain key features of the transaction criteria may be approved.

In some embodiments, a smart device (e.g., smart phone, smart refrigerator, smart watch, etc.) may detect that the user is planning to, or needs to, purchase an item or service but has not pre-configured the payment vehicle for the expected purchase. The user may be notified and asked whether the payment vehicle should be pre-configured for the expected purchase. If so, any known transaction criteria (e.g., item, merchant, amount, etc.) may be pre-populated by an application and/or selected for input by the user. The planned purchases may be detected from a calendar of the user (e.g., dentist appointment appearing on the user's calendar), a smart device in communication with a vehicle (e.g., detects that the fuel level is getting low or that an oil change/service is needed), smart refrigerator (e.g., detects that the user needs groceries), task list (e.g., the user has identified that the user will be bringing cupcakes to an event), or other sources.

In some embodiments, the user's location may be detected. The user's location may be a location in which the user may desire to make a purchase (e.g., a merchant), but the user has not pre-configured the payment vehicle for a transaction at the location. The user may be notified and asked whether the user would like to pre-configure a payment vehicle for a transaction at the location. In some embodiments, from the user's perspective, pre-configuring the payment vehicle may be a quick process such as a selection to authorize transactions at the particular merchant location for the next two hours. In other embodiments, a user may have pre-configured the payment vehicle for a transaction at the merchant location but included another limitation such as a transaction amount limitation. The user may be reminded of the other limitations where applicable. For example, if the user's location is detected to be in a particular merchant location that the user has pre-configured a payment vehicle for use at, the user may receive a notification alerting the user to of the specifics of the pre-configuration (e.g., transaction amount, type of good or services that can be purchased, any restrictions on times, etc.).

In some embodiments, once a payment vehicle is pre-configured, funds associated with the payment vehicle are put into reserve. For example, if the pre-configured payment vehicle is a debit card, only funds exceeding the amount needed for the transaction associated with the pre-configured debit card can be withdrawn from the debit card account. Thus, in some embodiments, there may be restrictions on the amount of pre-configurations that can be made. In some embodiments, where an amount is not included as transaction criteria, an amount may be estimated.

In the following description, for the purposes of explanation, numerous specific details are set forth in order to provide a thorough understanding of embodiments of the present disclosure. It will be apparent upon reading the disclosure, however, to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device, a mobile phone, a tablet computer, a mobile media device, wearable computing device, a mobile gaming device, a vehicle-based computer, a dedicated terminal, a public terminal, desktop or laptop computer, a kiosk, etc.). In some embodiments, applications 105A-105N may be stored on the computing device or may be stored remotely. These computing devices can include mechanisms for receiving and sending traffic by connecting through network 115 to Point of Sale ("POS") 120, smart devices 125, pre-configuration and authorization engine 130, and data stores 135 and 140.

Computing devices 110A-110M may be configured to communicate via the network 115 with pre-configuration and authorization engine 130. In some embodiments, computing devices 110A-110M can retrieve or submit information to pre-configuration and authorization engine 130 and run one or more applications with customized content retrieved by pre-configuration and authorization engine 130 and data stores 135 and 140. For example, computing devices 110A-110M can execute a browser application or a customized client to enable interaction between the computing devices 110A-110M and pre-configuration and authorization engine 130 and data stores 135 and 140.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (Ipsec).

POS 120 can be the place or mechanism in which a retail transaction is completed. In other words, a customer may pay a merchant for goods or services at POS 120. During a transaction, POS 120 may receive one or more payment mechanisms (e.g., a payment vehicle) from a customer and may request authorization from an organization to process the transaction using the one or more payment mechanisms. POS 120 may also issue receipts for the transaction. In some embodiments, the POS may be a payment portal website.

Smart devices 125 can be any electronic device that can be operated interactively and autonomously, including, but not limited to smart refrigerators, smart watches, smart rings, mobile computing devices, tablets, vehicle computing devices, etc. Smart devices 125 may be connected to other devices or networks (e.g., network 115, user computing devices 105Aa-105N, and pre-configuration and authorization engine 130) via different protocols such as Bluetooth, NFC, WiFi, 3G, etc. Smart devices 125 can be used to gather information relating to potential purchases of a user. For example, a smart refrigerator may prepare and send a grocery list. The information relating to the potential purchases may be sent to pre-configuration and authentication engine 130, stored in data stores 135 or 140, and/or sent to computing devices 110A-110M. This information can be used to automatically pre-configure a payment vehicle for a transaction. In other cases, this information may be used to help the user prepare or update a pre-configuration request with transaction criteria.

Pre-configuration and authorization engine 130 can be running on one or more servers and can be used to receive pre-configuration information (e.g., transaction criteria) from computing devices 110A-110M as well as authorization requests for transactions from POS 120. When an authorization request is received from POS 120, pre-configuration and authorization engine 130 may compare information in the transaction request with transaction criteria associated with the payment vehicle to determine whether the payment vehicle should be authorized for the transaction. Pre-configuration and authorization engine 130 may be communicably coupled with POS 120, smart devices 125, data stores 135 and 140, and computing devices 110A-110M. Pre-configuration and authorization engine 130 may communicate, access, or receive data (e.g., user profiles, transaction criteria, verification information, etc.) from computing devices 110A-110M, POS 120, smart devices 125, and/or data stores 135 and 140. Pre-configuration and authorization engine 130 may be associated with a membership organization and the users may be members or potential members of the membership organization. The organization may be a financial institution and/or an insurance company.

Authorizations given or denied by pre-configuration and authorization engine 130 may be based on a comparison of stored information received through various user interfaces running on computing devices 110A-110M or other interactions, communications, and/or other inputs (e.g., e-mails, tokens, and/or communications via other channels) with transaction information received through channels such as POS 120. Pre-configuration and authorization engine 130 can be calibrated/configured by individual companies or service providers based on risk tolerance and/or other business objectives to authorize transactions.

In some cases, authorization for a given transaction may be based on various criteria. For example, in addition to rendering an authorization decision, pre-configuration and authorization engine 130 may be configured to compute a risk profile or score. The risk profile may be used by itself to make an authorization decision, report potential fraud, or transfer the authorization request to a different evaluation mechanism (e.g., manual review).

In some embodiments, the risk profile may be used in conjunction with other profiles, scores, and/or business practices. Pre-configuration and authorization engine 130 may also be configured to recommend additional procedures a merchant can follow to achieve an authorization of the payment vehicle. For example, the payment vehicle may be authorized if the user can provide a biometric sample, an address, birthday, or some other authenticating information. This information may be transmitted via a user's mobile device, the POS, or other device to pre-configuration and authorization engine 130 for verification. In some embodiments, the payment vehicle may be authorized for the transaction if the user sends a notification to the organization, verifying the transaction or if the user responds to a notification sent to the user.

In some embodiments, pre-configuration and authorization engine 130 includes various data processing and analytic tools that allow for implementation, creation, and evaluation of users and user information retrieved from data stores 135 and 140 in order to create or determine these procedures. For example, the user may have provided certain information that can be used to verify the user (e.g., birthday, biometric information, location information, etc.). In some embodiments, the user may have identified a preferred method of authentication.

Data stores 135 and 140 can be used to manage storage and access to user data such as transaction criteria, registered user devices, user identifications, token IDs, financial information, authentication history, user preferences, purchase history, previous pre-configurations, member identification numbers, device fingerprints, personal identification numbers, and other information. Data stores 135 and 140 may be a data repository of a set of integrated objects that are modeled using classes defined in database schemas. Data stores 135 and 140 may further include flat files that can store data. Pre-configuration and authorization engine 130 and/or other servers may collect and/or access data from the data stores 135 and 140.

Figure 2:
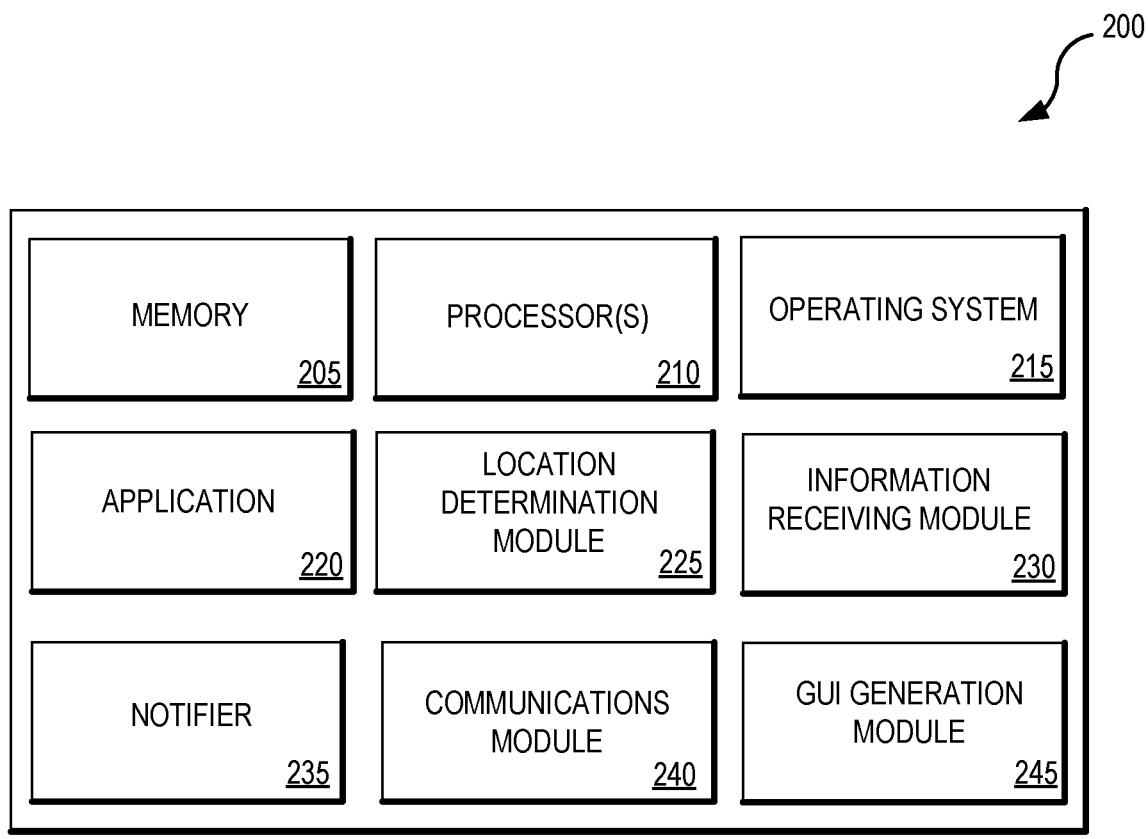
FIG. 2 illustrates various components of a system that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, location determination module 225, information receiving module 230, notifier 235, communications module 240, and graphical user interface ("GUI") generation module 245. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, information receiving module 230 and location determination module 225 can be combined into a single component.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, location determination module 225, information receiving module 230, notifier 235, communications module 240, and GUI generation module 245.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with pre-configuration and authorization engine 130. For example, application 220 can include a pre-configuration application, a money transfer application, a social networking application, a gaming application, and the like.

Application 220 can access a server or other computing device associated with an organization (e.g., pre-configuration and authorization engine 130) to access payment vehicle account information (e.g., current pre-configuration status or current transaction criteria) and to receive pre-configuration data relating to a payment vehicle. The pre-configuration data may be used to pre-configure a payment vehicle for a user such that only transactions meeting transaction criteria in the pre-configuration data will be approved. Pre-configuration data may include transaction criteria such as a total amount of all items purchased at a location, an allowed amount for each item purchased, an identification of items or services, a merchant, a zip code, a time, a date, a day of the week, etc.

Application 220 may receive and/or collect the pre-configuration data from notifier 235, smart devices 125, a user, information receiving module 230, pre-configuration and authorization engine 130, or other sources. For example, application 220 may receive a notification from notifier 235 that the user has a dentist appointment on a particular date and that the user should consider pre-configuring a transaction in anticipation of paying for the dentistry services. In response to receiving the notification, application 220 may be launched to collect information to pre-configure the payment vehicle. Pre-configuration data may be input into application 220 by a user (e.g., transaction criteria) or application 220 may collect information from various sources such as a calendar from the user, the notification, data stores 135 and 140, or other sources. The pre-configuration data may be communicated to an organization via communications module 245 where the payment vehicle is pre-configured for a particular transaction.

In some embodiments, application 220 allows the user to pre-configure the payment vehicle for numerous transactions and set up recurring pre-configured transactions. In some embodiments, the user may specify a time or date for a transaction. If the time expires before the user makes the purchase, application 220 may ask the user if the user would like to reschedule the transaction by selecting another date and/or time to pre-configure the payment vehicle for the same transaction.

In some embodiments, transaction criteria may include a list of items. Application 220 may receive or generate the list of items by receiving scanned barcodes or other identifiers of the items (e.g., images) from a computing device. In an example, application 220 may receive an indication that the user's vehicle is low on fuel and that the user should purchase fuel within the next several miles or several days. The user may be alerted to remind the user to pre-configure the payment vehicle for a fuel purchase.

Location determination module 225 can determine a location of a user. In some embodiments, a mobile device of the user such as computing devices 110A-110M may be used using mobile phone tracking, GPS, real-time locating systems, or other technologies. Location information may include a particular merchant, a zip code, an address, a category of merchants, coordinates, or other location information. Location determination module 225 may communicate the location information to notifier 235, application 220, and/or pre-configuration and authorization engine 130. Location information may be used to pre-fill pre-configuration data in application 220.

Information receiving module 230 can collect and/or receive information pertaining to purchases that may be made in the future. Information receiving module 230 may collect this information from various sources such as smart devices 125, calendars of the user, events relating to other accounts of the user (e.g., claims insurance), emails, etc. The information may be used to notify the user of an upcoming purchase, reminding the user that the payment vehicle may need to be pre-configured for the upcoming purchase. The information may relate to planned or recurring purchases (e.g., water bill, phone bill, Saturday night trip to movie theater), unscheduled purchases (e.g., clothes shopping, expenses relating to car accident, dining out), or other purchases. Information receiving module 230 may communicate the information to notifier 235, application 220, and/or pre-configuration and authorization engine 130.

In an example, a smart refrigerator may inform information receiving module 230 that the user is out of milk, eggs, and carrots and is low on orange juice. Information receiving module 230 may organize the items into a list that can be used to pre-configure a payment vehicle for purchasing those items.

Notifier 235 can notify, remind, or alert the user of an upcoming or anticipated purchase that the user may want to pre-configure a payment vehicle for. The notification may be an email, text, push notification, etc. The notification from notifier 235 may be prompted by information received from information receiving module 230, location determination module 225, and/or pre-configuration and authorization engine 130. For example, if location determination module 225 detects that the user is near a gas station, information receiving module 230 indicates the user is low on fuel, and pre-configuration and authorization engine 130 detects that a transaction at a gas station is not pre-configured, notifier 235 may send a notification to a computing device of the user reminding the user to pre-configure a payment vehicle for a gas purchase. Information provided in the notification may be used to pre-fill in transaction criteria to pre-configure the payment vehicle. In some embodiments, a link in the notification takes the user to a tab or page in application 220 in which the user can input pre-configuration data or review the pre-filled pre-configuration data.

Communications module 240 can send and receive information relating to the payment vehicle including pre-configuration requests, pre-configuration status, approvals, authorizations, etc. to and from pre-configuration and authorization engine 130. For example, communications module 240 may send pre-configuration information from a computing device 110 to pre-configuration and authorization engine 130 to pre-configure the payment vehicle for a transaction.

GUI generation module 245 can generate one or more GUI screens that allow for interaction with a user. In at least one embodiment, GUI generation module 245 generates a graphical user interface receiving and/or conveying information to the user. For example, the GUI generation module 245 may display a pre-configuration interface in which the user can select or input transaction criteria in advance of a purchase. As another example, GUI generation module 245 may display a management interface that allows a user to review, cancel, or modify and pre-configurations.

Figure 3:
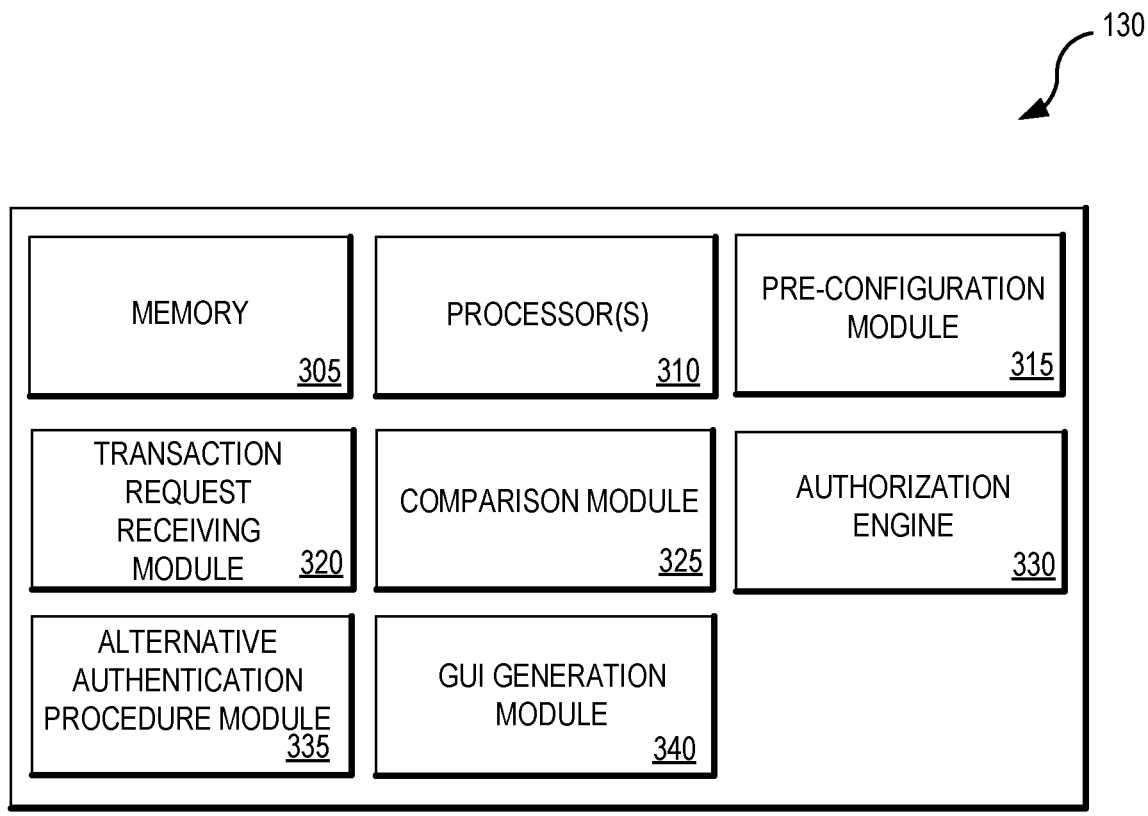
FIG. 3 illustrates various components of a system that may be used in accordance with one or more embodiments of the disclosure.

FIG. 3 illustrates a set of components within pre-configuration and authorization engine 130 according to one or more embodiments of the present disclosure. According to the embodiments shown in FIG. 3, pre-configuration and authorization engine 130 can include memory 305, one or more processors 310, pre-configuration module 315, transaction request receiving module 320, comparison module 325, authorization engine 330, alternative authentication procedure module 335, and GUI generation module 340. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, pre-configuration module 315, transaction request receiving module 320, and comparison module 325 can be combined into a single module for authorizing the transaction.

In some embodiments, the functionality of the components of computing device 110 described with respect to FIG. 2 may be included in one or more components of the pre-configuration and authorization engine 130 described with respect to FIG. 3. For example, pre-configuration and authorization engine 130 may receive information from smart devices just as computing device 110 receives from information receiving module 230.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of pre-configuration module 315, transaction request receiving module 320, comparison module 325, authorization engine 330, alternative authentication procedure module 335, and GUI generation module 340.

Pre-configuration module 315 pre-configures a payment vehicle such that only transactions meeting (or nearly meeting) transaction criteria are approved. The transaction criteria may have varying levels of specificity from general ranges to specifically identified store types, transaction amounts, dates, etc. In order to pre-configure a payment vehicle, in some embodiments, entries into various logs, exception lists, or change settings can be used to determine if a transaction request should be authorized. Pre-configuring may also include, for example, removing or loosening certain fraud mechanisms.

In some embodiments, all transaction criteria must be met before a transaction is authorized and in other embodiments, only certain portions of the transaction criteria have to be met before the transaction is authorized. Pre-configuration module 315 may receive pre-configuration data from a computing device 110 of a user, including but not limited to a merchant, an amount, a time, a date, an item or list of items, category of items, and/or a category of merchant. The pre-configuration data may be used to deny, partially authorize, or authorize any authorization requests received from transaction request receiving module 320.

Pre-configuration module 315 may also communicate with application 120 and/or user computing device the pre-configuration status of a payment vehicle (e.g., pre-configured for a transaction or not, what the transaction criteria are if the payment vehicle was pre-configured, etc.). If a payment vehicle is pre-configured for a certain transaction and the date or other transaction criteria makes the transaction invalid (e.g., expires), then the user may be notified and allowed to change the date or update the other transaction criteria as desired.

Transaction request receiving module 320 receives a transaction request from a POS such as POS 120 requesting that the transaction be authorized. The transaction request may include information relating to the transaction. Information relating to the transaction may include the merchant requesting the transaction, the amount of the transaction, the items or services being purchased, the date, the time, and other information relating to the transaction.

Comparison module 325 may receive information relating to the transaction from transaction request receiving module 320 and compare this information with the transaction criteria received from pre-configuration module 315. The results of the comparison module 325 may be communicated to authorization engine 330 to determine whether the transaction will be authorized or denied. Comparison module 325 may compute an authorization score based on a closeness of the match. In some embodiments, certain criteria are treated with a higher priority than other criteria for purposes of the comparison. For example, the user may have indicated transaction criteria including Home Depot®, washer and dryer, and April 31-May 15, whereas the information in the transaction request includes Lowes®, washer and dryer, May 1st. In this case, comparison module 325 may compute a higher match than if the transaction request had included a lawn mower, Home Depot®, and May 1st. Thus, in this case, the item is given a higher importance than the merchant.

Authorization engine 330 receives comparison information from comparison module 325, determines whether the transaction should be authorized, and sends an authorization or denial message to POS 120. In some embodiments, all of the transaction criteria must be met before the transaction is authorized. In other embodiments, a certain percentage or prioritized transaction criteria must be met. Authorization engine 330 may communicate any denials of transactions to alternative authentication procedure module 335 to determine any additional authentication procedures that may be used.

Alternative authentication procedure module 335 receives a denial message from authorization engine 335 and determines whether additional authentication procedures are possible, and, if so, what procedures those may be. For example, if the transaction is denied, alternative authentication procedure module 335 may send a text message to the user and authorize the transaction if the user responds to a text message sent by the organization. In other embodiments, alternative authentication procedure module 335 sends a set of instructions to the merchant providing additional authentication information that can be used to authenticate the user so that the transaction can be authorized. In some embodiments, the user may provide a voice sample, biometric data, a secret code, a mobile number, an answer to a security question, or other authenticating information. In some embodiments, the risk may be shifted onto the merchant for the merchant to bear the risk if the user is fraudulent but still passes the alternative authentication procedure.

GUI generation module 340 can generate one or more GUI screens that allow for interaction with a user. In at least one embodiment, GUI generation module 340 generates a graphical user interface receiving and/or conveying information to the user. For example, the GUI generation module 340 may display a pre-configuration interface in which a representative can view the pre-configuration status of a payment vehicle in addressing a customer question.

Figure 4:
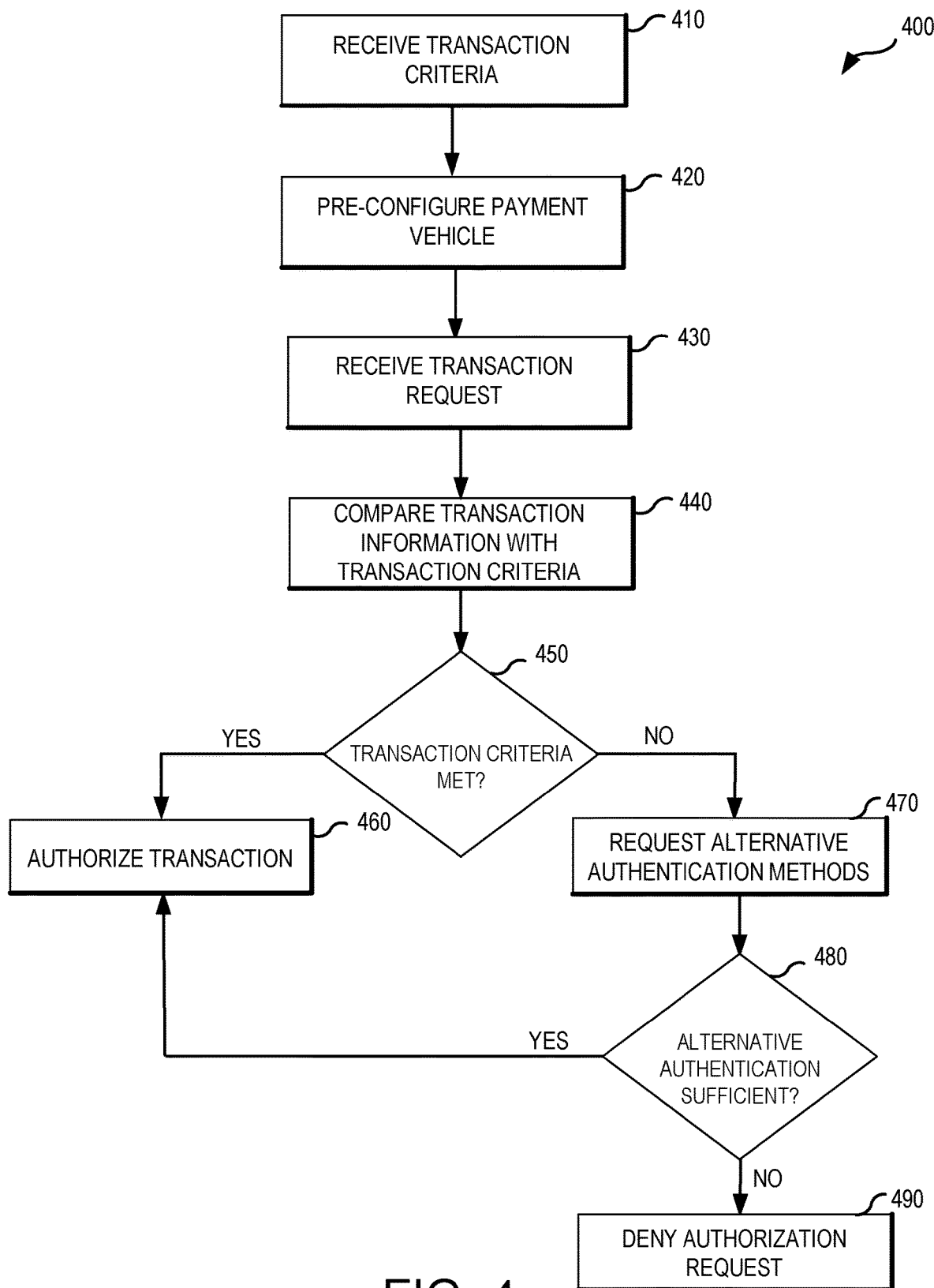
FIG. 4 is a flowchart illustrating a set of operations that can be used to authorize a payment vehicle for a transaction in accordance with various embodiments of the present disclosure.

FIG. 4 is a flowchart illustrating a set of operations 400 that can be used to authorize a payment vehicle for a transaction in accordance with various embodiments of the present disclosure. The operations illustrated in FIG. 4 may be performed by one or more components, devices, or modules such as, but not limited to, pre-configuration module 315, transaction request receiving module 320, comparison module 325, authorization engine 330, alternative authentication procedure module 335, or other components, modules, or devices. In some embodiments, fewer than all of the steps are performed, whereas in other embodiments additional operations are performed.

Receiving transaction criteria operation 410 receives transaction criteria that may be used to pre-configure a payment vehicle for a specific transaction that is anticipated to be made. The transaction criteria may include a specific merchant, all merchants within a particular zip code, all purchases for a certain type of merchandise (e.g., the purchase of shoes), time, date, amount, etc. The transaction criteria may be received via an internet portal, a mobile application, a phone call, ATM, or other device or method of communication.

Pre-configuring payment vehicle operation 420 pre-configures the payment vehicle according to the transaction criteria so that transactions that do not meet some or all of the transaction criteria are denied. The pre-configuration may be accomplished on the server side by adding an extra layer to filter incoming transaction requests that do not meet the transactions criteria.

Receiving transaction request operation 430 receives a transaction request from a POS. The transaction request may include information about the transaction such as the time, date, merchant identification, items being purchased, etc. Comparing operation 440 compares the transaction information received from the POS with the transaction criteria previously received from the user. Transaction criteria decision operation 450 determines whether the transaction criteria have been met (or sufficiently met). If so, transaction criteria decision operation 450 branches to authorizing operation 460 where the transaction is authorized. An authorization message may be sent to the POS.

If transaction criteria decision operation 450 determines that the transaction criteria has not been met (or not sufficiently met), then transaction criteria decision operation 450 branches to requesting operation 470 which requests alternative authentication methods so that the transaction can be authorized. In other embodiments, the transaction may be denied if any one of the transaction criteria is not met. In other embodiments, a score may be computed and the transaction may be denied only if the score indicates that the transaction does not match a certain percentage of the transaction criteria or an important transaction criteria is not met (e.g., the zip code is out of state of the zip code indicated in transaction criteria), likely indicating fraud.

Authenticating decision operation 480 determines whether the alternative authentication received from the user is sufficient to authorize the transaction. If the alternative authentication information is sufficient, the transaction is authorized in authorizing operation 460. If the alternative authentication information is insufficient, then the authorization request is denied in denying operation 490.

Figure 5:
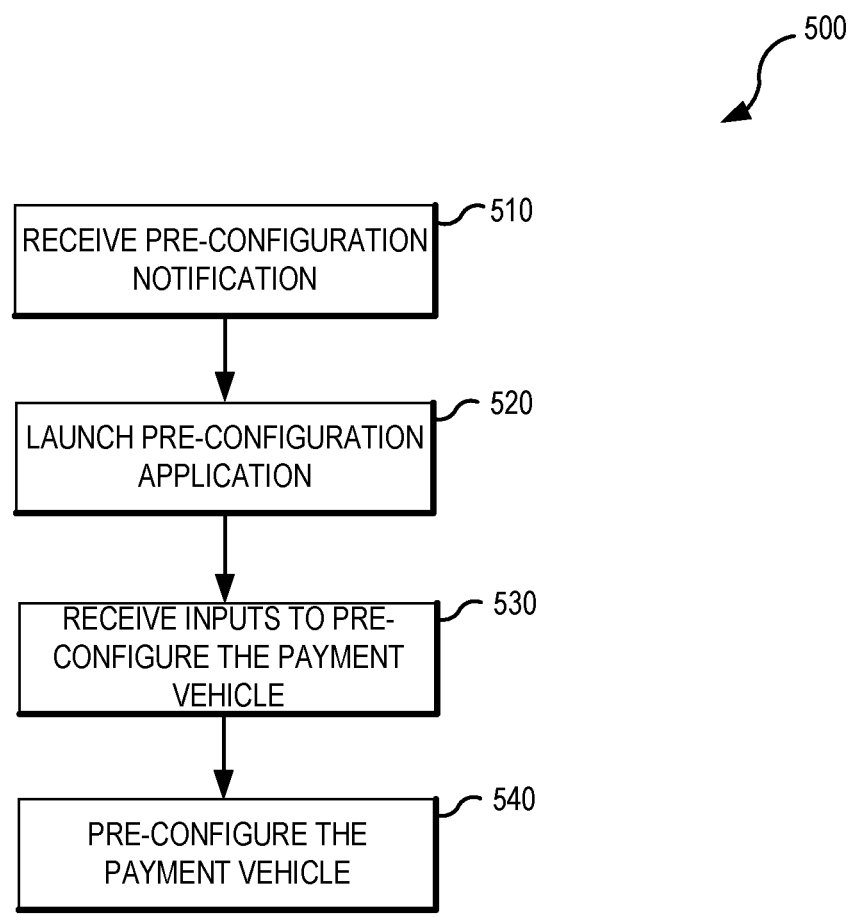
FIG. 5 is a flowchart illustrating a set of operations that can be used to pre-configure a payment vehicle for a transaction in accordance with various embodiments of the present disclosure.

FIG. 5 is a flowchart illustrating a set of operations 500 that can be used to pre-configure a payment vehicle for a transaction in accordance with various embodiments of the present disclosure. The operations illustrated in FIG. 5 may be performed by one or more components, devices, or modules such as, but not limited to, computing devices 110A-110M, application 220, location determination module 225, information receiving module 230, notifier 235, communications module 240, pre-configuration module 315, or other components, modules, or devices.

Receiving operation 510 receives a pre-configuration notification. The pre-configuration notification may be received on a computing device of a user (e.g., mobile phone) and may include an alert that the user has not pre-configured a payment vehicle for a purchase. The notification may be triggered by information relating to the location of the user (e.g., the user is at a merchant) and/or by information relating to a purchase that the user will likely be making within a certain period of time based on information gathered from other smart devices, a calendar of the user, or other sources (e.g., the user has a doctor's appointment next week and will be making a co-payment).

Launching operation 520 launches a pre-configuration application allowing the user to pre-configure a payment vehicle by inputting characteristics of an allowed transaction. Launching operation 520 may occur in response to the notification. Receiving operation 530 may receive inputs (e.g., transaction criteria) to pre-configure the payment vehicle. The inputs may be selected from a drop down list, automatically input based on historical purchases, automatically populated by location information or other information gathered from smart devices, or keyed in by the user. Pre-configuring operation 540 may pre-configure the payment vehicle such that only transactions meeting the criteria or a subset of the criteria will be authorized. The pre-configuring may take place on the server side by placing filters on authorizations, on a mobile wallet or on the payment vehicle itself. In some embodiments, the inputs may be communicated to the pre-configuration and authorization engine 130 to pre-configure the payment vehicle.

Figure 6:
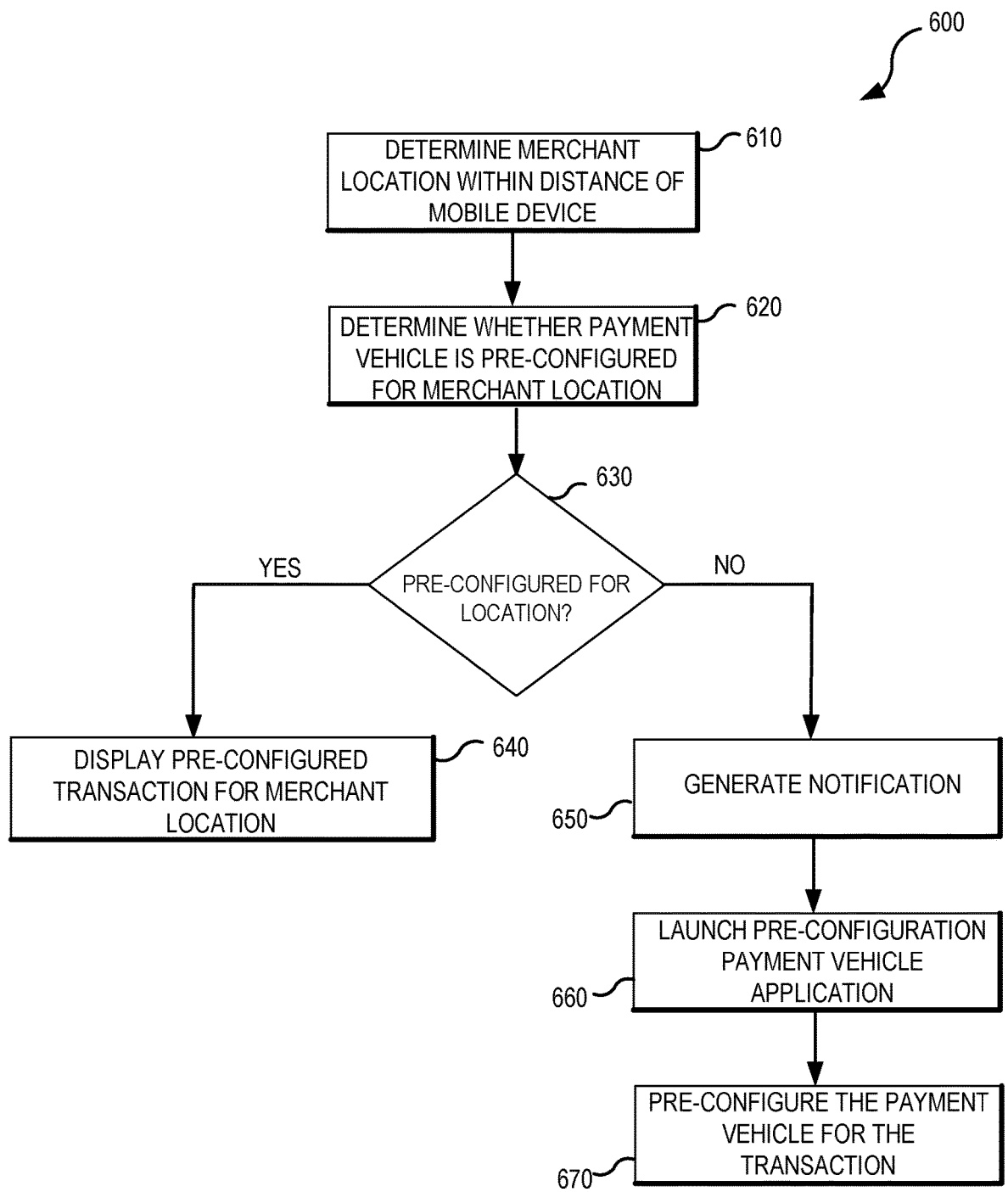
FIG. 6 is a flowchart illustrating a set of operations that can be used to pre-configure a payment vehicle for a transaction in accordance with various embodiments of the present disclosure.

FIG. 6 is a flowchart illustrating a set of operations 600 that can be used pre-configure a payment vehicle for a transaction in accordance with various embodiments of the present disclosure. The operations illustrated in FIG. 6 may be performed by one or more components, devices, or modules such as, but not limited to, computing devices 110A-110M, application 220, location determination module 225, information receiving module 230, notifier 235, communications module 240, pre-configuration module 315, transaction request receiving module 320, comparison module 325, authorization engine 330, alternative authentication procedure module 335, or other components, modules, or devices.

Determination operation 610 determines a merchant location within a distance of a mobile device. In some embodiments, the required distance may dictate that the user be actually at or in the merchant location, within twenty feet, etc. In some embodiments, social media may be used to determine the user's location (e.g., checking in on Facebook®). As another example, the GPS within mobile device of the user may be used to determine the user's location. In some embodiments, merchants may have signs with barcodes or other identifying indicia that, when manually scanned by a user device, identify the user's location.

Pre-configuring check operation 620 determines whether the payment vehicle has been pre-configured for a transaction at the merchant location. If the payment vehicle has been pre-configured for a transaction at the merchant location (or for certain purchases that would fall within the merchant location), decision operation 630 branches to displaying operation 640 which displays the pre-configured transaction information that applies to the merchant location. Displaying the pre-configured transaction information alerts the user to any restrictions such as a payment amount or types of purchases that are authorized. In addition, a user can update or revise the pre-configuration of the payment vehicle.

If the payment vehicle has not been pre-configured for a transaction at the merchant location (or for purchases that would fall within the merchant location), decision operation 630 branches to notification operation 650. Notification operation 650 generates a notification notifying the user that the payment vehicle has not been pre-authorized for a transaction at the merchant location and inquiring whether the user would like to pre-configure the payment vehicle for a transaction at the merchant location. Launching operation 660 launches a pre-configuration application allowing the user to pre-configure a transaction if the user desires to use the payment vehicle at the merchant location. The payment vehicle is pre-configured for a transaction at the merchant location in pre-configuring operation 670.

Figure 7:
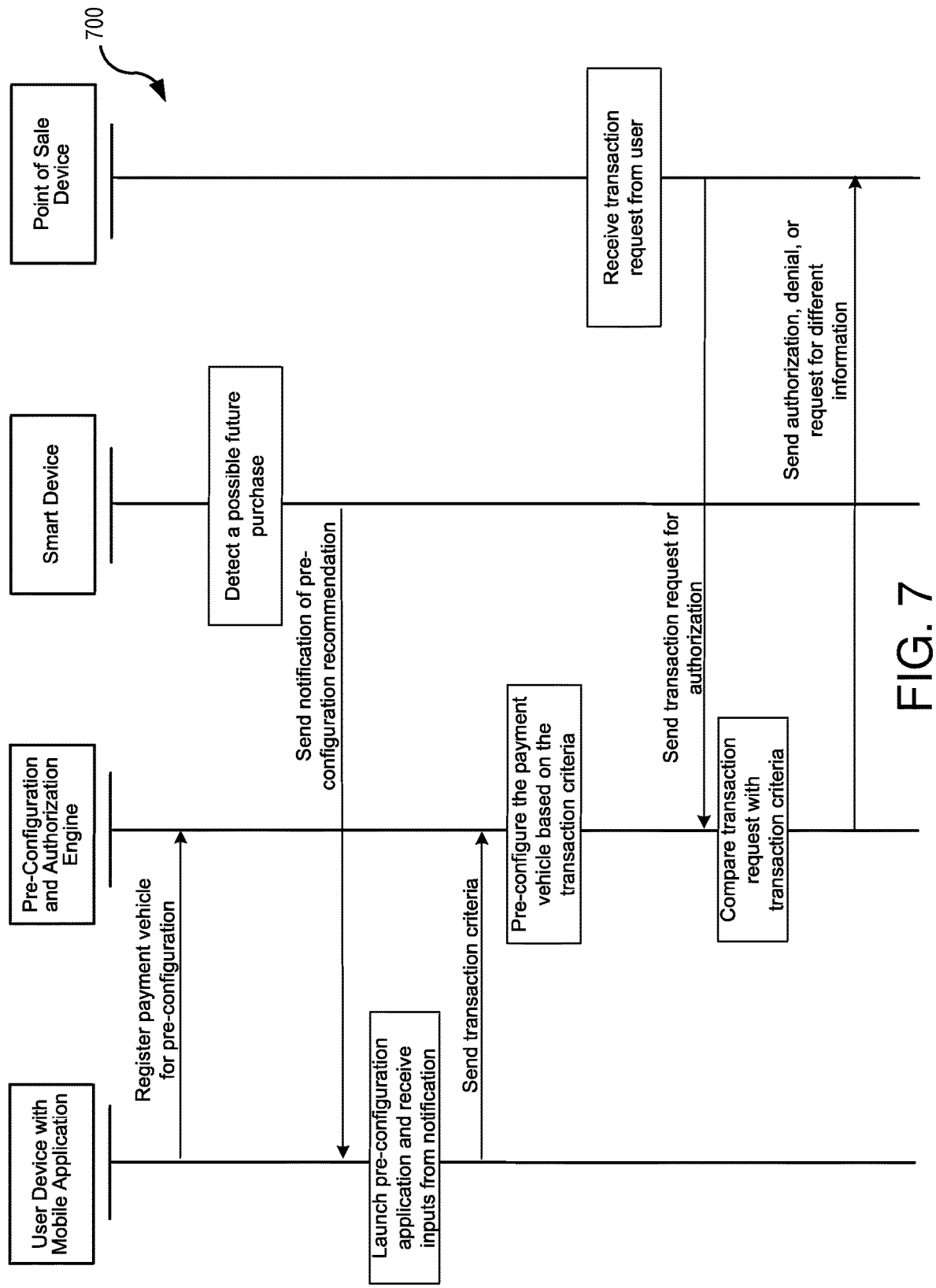
FIG. 7 is a sequence diagram illustrating various interactions between components of a networked-based system in accordance with some embodiments of the present disclosure.

FIG. 7 is a sequence diagram illustrating various interactions between components of a network-based system in accordance with some embodiments of the present disclosure. A user device with a mobile application registers a payment vehicle for pre-configuration with a pre-configuration and authorization engine. In some embodiments, pre-configuring a payment vehicle means that the payment vehicle will not be authorized for transactions that do not meet transaction criteria previously identified by the user.

A smart device may detect a possible future purchase and notify the user via the mobile application. A pre-configuration application may be launched on the user device. In some embodiments, the pre-configuration application may be launched based on the detected future purchases. The user may input transaction criteria or the transaction criteria may be gathered an automatically input from the notification and sent to the pre-configuration and authorization engine to pre-configure the payment vehicle.

The user may make a transaction request at a POS. The transaction request may be sent from the POS to the pre-configuration and authorization engine to determine whether the transaction meets the transaction criteria. After the information in the transaction request is compared to the transaction criteria, the pre-configuration and authorization engine sends an authorization, denial, or request for additional information to the POS.

Computer System Overview

Figure 8:
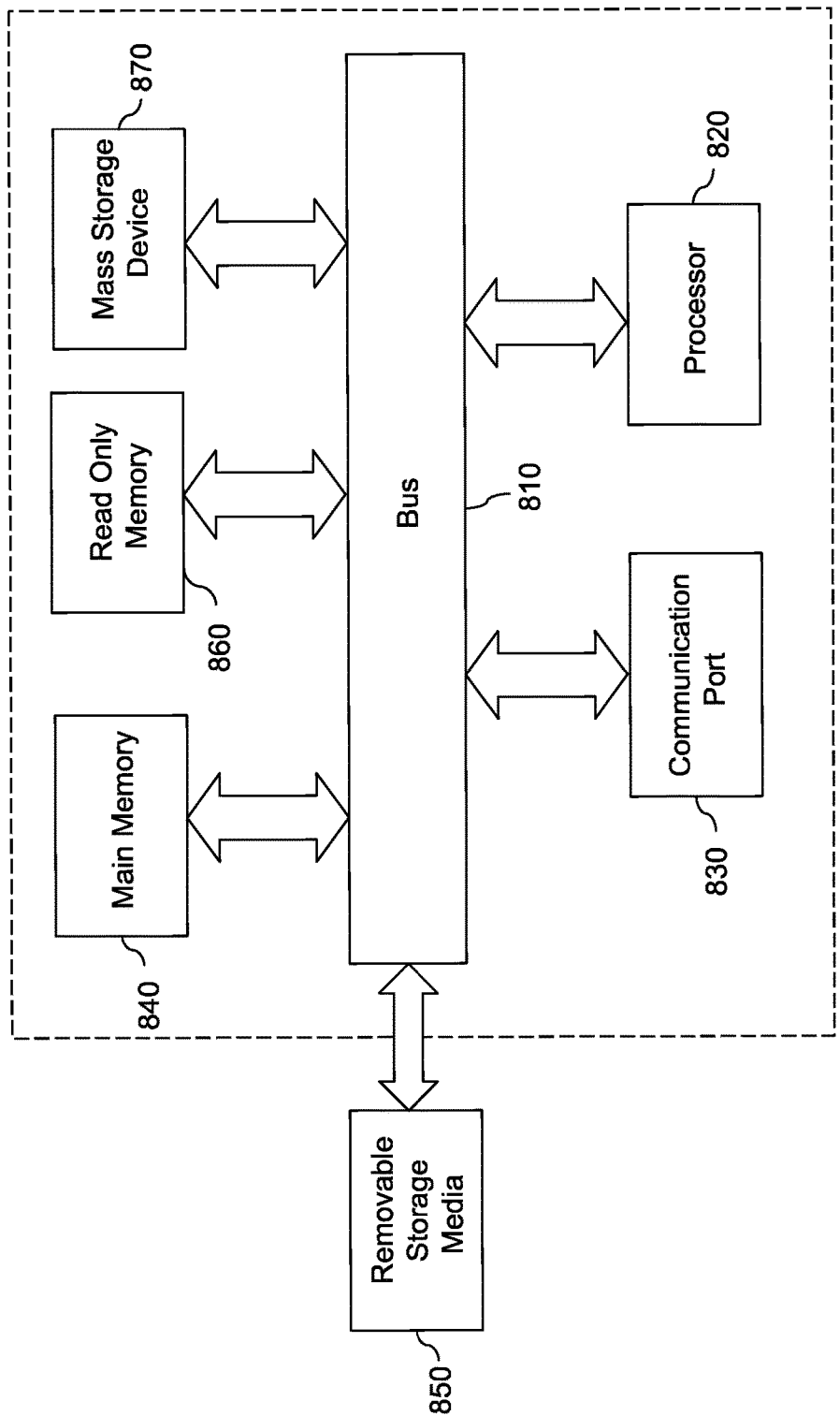
FIG. 8 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present disclosure may be utilized. According to the present example, the computer system includes a bus 810, at least one processor 820, at least one communication port 830, a main memory 840, a removable storage media 850, a read only memory 860, and a mass storage 870.

Processor(s) 820 can be any known processor, such as, but not limited to, an Intel® Itanium® or Itanium 2® processor(s), or AMD® Opteron® or Athlon MP® processor(s), or Motorola® lines of processors. Communication port(s) 830 can be any of an RS-232 port for use with a modem-based dialup connection, a 10/100 Ethernet port, or a Gigabit port using copper or fiber. Communication port(s) 830 may be chosen depending on a network such a Local Area Network (LAN), Wide Area Network (WAN), or any network to which the computer system 800 connects.

Main memory 840 can be Random Access Memory (RAM), or any other dynamic storage device(s) commonly known in the art. Read only memory 860 can be any static storage device(s) such as Programmable Read Only Memory (PROM) chips for storing static information such as instructions for processor 820.

Mass storage 870 can be used to store information and instructions. For example, hard disks such as the Adaptec® family of SCSI drives, an optical disc, an array of disks such as RAID, such as the Adaptec family of RAID drives, or any other mass storage devices may be used.

Bus 810 communicatively couples processor(s) 820 with the other memory, storage, and communication blocks. Bus 810 can be a PCI/PCI-X or SCSI based system bus depending on the storage devices used.

Removable storage media 850 can be any kind of external hard-drives, floppy drives, IOMEGA® Zip Drives, Compact Disc-Read Only Memory (CD-ROM), Compact Disc-Re-Writable (CD-RW), or Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for pre-configuring a payment vehicle. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:
    determining a location of a mobile computing device associated with a user;
    in response to determining the location of the mobile computing device, determining, by a computing device of an issuer of a payment vehicle associated with the user, a merchant location within a distance of the mobile computing device;
    electronically notifying the user to pre-configure the payment vehicle for a transaction at the merchant location;
    launching a pre-configuration payment vehicle application on the mobile computing device;
    receiving transaction criteria for the transaction via the pre-configuration payment vehicle application; and
    pre-configuring, by the computing device of the issuer of the payment vehicle, the payment vehicle with the transaction criteria for the merchant location via the pre-configuration payment vehicle application.

2. The method of claim 1, wherein the transaction criteria includes one or more items, the merchant location, and a timeframe.

3. The method of claim 1, wherein the payment vehicle will not be authorized for transactions that do not meet the transaction criteria.

4. The method of claim 1, the method further comprising: receiving, from a smart device associated with the user, an indication of an item the user needs to purchase.

5. The method of claim 4, the method further comprising: in response to receiving the indication of the item, automatically including the item as at least a portion of the transaction criteria.

6. The method of claim 4, wherein the smart device is a smart refrigerator, and wherein the item includes a food item that is detected as being absent from the smart refrigerator.

7. The method of claim 1, the method further comprising:
    receiving, at the computing device of the issuer of the payment vehicle from a point of sale device, a transaction authorization request for an attempted transaction, the transaction authorization request generated by the point of sale device in response to an attempted use of the payment vehicle,
    wherein the transaction authorization request includes information about the attempted transaction; and
    comparing, by the computing device of the issuer of the payment vehicle, the information about the attempted transaction with the transaction criteria to determine whether to authorize the attempted transaction.

8. A non-transitory computer-readable storage medium comprising a set of instructions that, when executed by one or more processors, cause the one or more processors to perform operations comprising:
    determining a location of a mobile computing device associated with a user;

in response to determining the location of the mobile computing device, determining a merchant location within a distance of the mobile computing device;
electronically notifying the user to pre-configure a payment vehicle for a transaction at the merchant location;
launching a pre-configuration payment vehicle application on the mobile computing device;
receiving transaction criteria for the transaction via the pre-configuration payment vehicle application; and
pre-configuring the payment vehicle with the transaction criteria for the merchant location via the pre-configuration payment vehicle application.

9. The non-transitory computer-readable storage medium of claim 8, wherein the transaction criteria includes one or more items, the merchant location, and a timeframe.

10. The non-transitory computer-readable storage medium of claim 8, wherein the payment vehicle will not be authorized for transactions that do not meet the transaction criteria.

11. The non-transitory computer-readable storage medium of claim 8, wherein the operations further comprise: receiving, from a smart device associated with the user, an indication of an item the user needs to purchase.

12. The non-transitory computer-readable storage medium of claim 11, wherein the operations further comprise: in response to receiving the indication of the item, automatically including the item as at least a portion of the transaction criteria.

13. The non-transitory computer-readable storage medium of claim 11, wherein the smart device is a smart refrigerator, and wherein the item includes a food item that is detected as being absent from the smart refrigerator.

14. The non-transitory computer-readable storage medium of claim 8, wherein the operations further comprise:
receiving, at a computing device of an issuer of the payment vehicle from a point of sale device, a transaction authorization request for an attempted transaction, the transaction authorization request generated by the point of sale device in response to an attempted use of the payment vehicle,
wherein the transaction authorization request includes information about the attempted transaction; and
comparing, by the computing device of the issuer of the payment vehicle, the information about the attempted transaction with the transaction criteria to determine whether to authorize the attempted transaction.

15. A pre-configuration and authorization engine comprising:
one or more processors; and
a computer readable storage medium having instructions stored thereon, which when executed by the one or more processors, cause the pre-configuration and authorization engine to:
determine a location of a mobile computing device associated with a user;
in response to determining the location of the mobile computing device, determine a merchant location within a distance of the mobile computing device;
electronically notify the user to pre-configure a payment vehicle for a transaction at the merchant location;
launch a pre-configuration payment vehicle application on the mobile computing device;
receive transaction criteria for the transaction via the pre-configuration payment vehicle application; and
pre-configure the payment vehicle with the transaction criteria for the merchant location via the pre-configuration payment vehicle application.

16. The pre-configuration and authorization engine of claim 15, wherein the transaction criteria includes one or more items, the merchant location, and a timeframe, wherein the transaction criteria is at least partially pre-filled based on the location of the mobile computing device associated with the user.

17. The pre-configuration and authorization engine of claim 15, wherein the instructions, when executed by the one or more processors, further cause the pre-configuration and authorization engine to: receive, from a smart device associated with the user, an indication of an item the user needs to purchase.

18. The pre-configuration and authorization engine of claim 17, wherein the instructions, when executed by the one or more processors, further cause the pre-configuration and authorization engine to: in response to receiving the indication of the item, automatically include the item as at least a portion of the transaction criteria.

19. The pre-configuration and authorization engine of claim 17, wherein the smart device is a smart refrigerator, and wherein the item includes a food item that is detected as being absent from the smart refrigerator.

20. The pre-configuration and authorization engine of claim 15, wherein the instructions, when executed by the one or more processors, further cause the pre-configuration and authorization engine to:
receive, at a computing device of an issuer of the payment vehicle from a point of sale device, a transaction authorization request for an attempted transaction, the transaction authorization request generated by the point of sale device in response to an attempted use of the payment vehicle,
wherein the transaction authorization request includes information about the attempted transaction; and
compare, by the computing device of the issuer of the payment vehicle, the information about the attempted transaction with the transaction criteria to determine whether to authorize the attempted transaction.

\* \* \* \* \*